Feb. 5, 1929.

G. L. KIER 1,700,738

SEED DRILL

Filed April 27, 1928

2 Sheets-Sheet 1

INVENTOR
George L. Kier.
BY
ATTORNEYS

WITNESS

Feb. 5, 1929. 1,700,738
G. L. KIER
SEED DRILL
Filed April 27, 1928 2 Sheets-Sheet 2
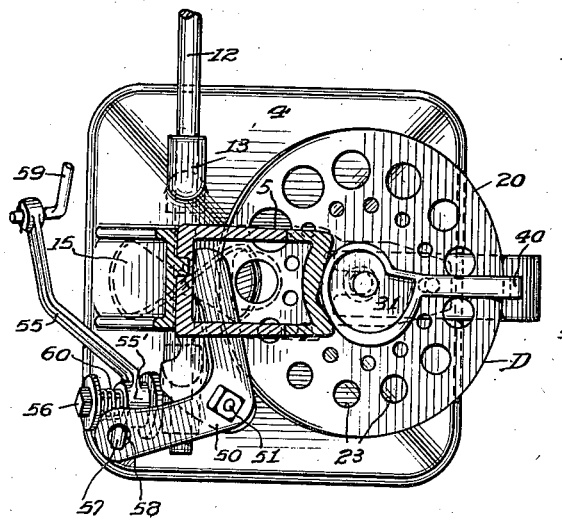
Fig. 3.
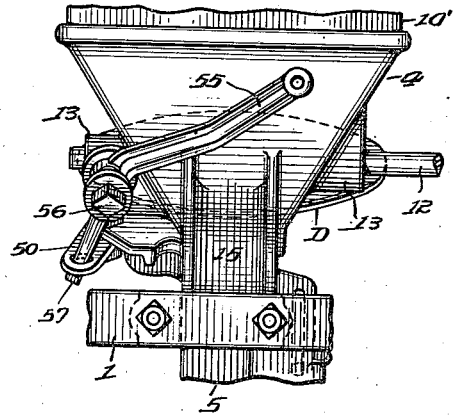
Fig. 4.
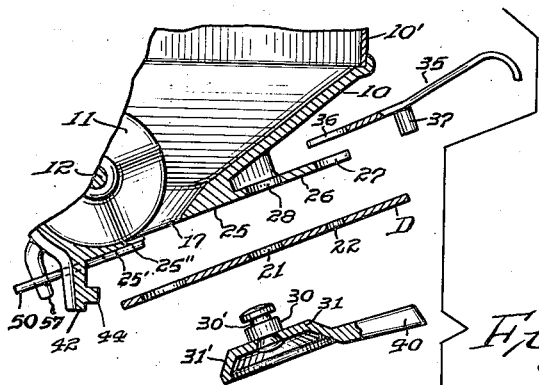
Fig. 5.
Fig. 6.
Fig. 7.
WITNESS
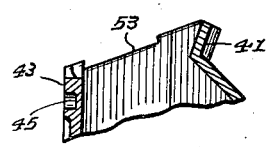
INVENTOR
George L. Kier.
BY
ATTORNEYS Patented Feb. 5, 1929.

1,700,738

UNITED STATES PATENT OFFICE.

GEORGE L. KIER, OF PHILADELPHIA, PENNSYLVANIA, ASSIGNOR TO S. L. ALLEN & CO., INC., A CORPORATION OF PENNSYLVANIA.

SEED DRILL.

Application filed April 27, 1928. Serial No. 273,183.

Among the principal objects of this invention is to provide in a seed drill embodying interchangeable rotatable disks each having a plurality of seed feed openings of varying sizes designed to regulate the flow of seed in accordance with the particular kind or size of seed which is being sowed and the quantity thereof which it is desired to distribute per linear yard of furrow, means for holding the disks in position and insuring proper registration of their different seed feed openings with the aperture in the bottom of the hopper through which the seed is released; to provide a seed drill having a removable hopper and improved means for locking the hopper on the delivery spout of the drill; to provide in a seed drill employing interchangeable seed feed disks having different sized feed openings, improved means for adjusting the disks whereby any desired opening may be conveniently brought to and thereafter locked in feeding position; to provide a seed drill of such construction that the seed feed disks may be readily interchanged when desired, and to provide a drill having improved means for cutting off the flow of seed to the furrow without interfering with or changing the adjustment of the feed disk.

The invention further contemplates the general improvement and simplification of seed drills of the general character of those to which my invention more particularly relates and further includes other objects and novel features of design, construction and arrangement hereinafter more definitely specified or which will be apparent from the following description of one form of drill constructed in accordance with my invention and illustrated in the accompanying drawings in which, however, only so much of the drill is shown as is requisite for adequate comprehension of the invention.

Figure 1:
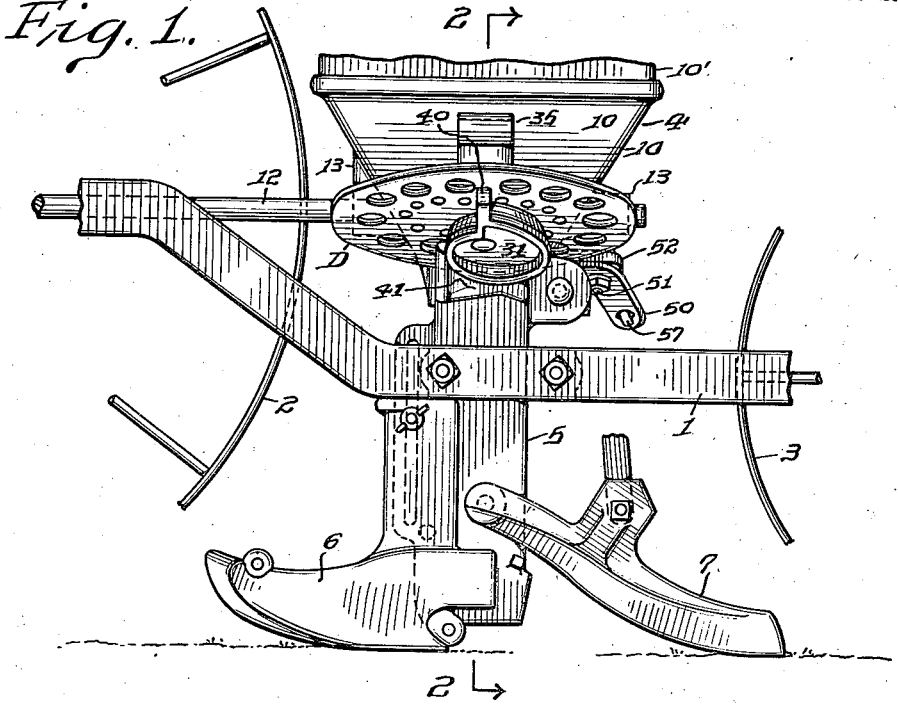
Figure 2:
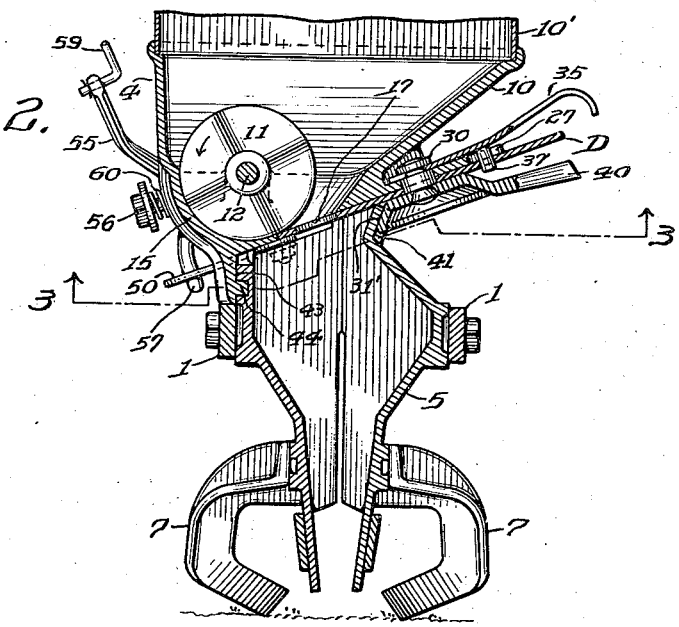

In the said drawings Fig. 1 is a fragmentary elevation of the left hand side of the drill and Fig. 2 is a vertical section thereof substantially on the line 2—2 of Fig. 1. Fig. 3 is a transverse section substantially on the line 3—3 of Fig. 2 and Fig. 4 is a fragmentary elevation on the right hand side of the lower portion of the hopper and adjacent parts. Fig. 5 is a composite fragmentary view, principally in central vertical longitudinal section, intended to illustrate the method of assembly of certain of the parts and Figs. 6 and 7 are respectively face views of two of the interchangeable feeding disks removed from the drill. All sections are to be understood as taken in the directions indicated by the arrows on the section lines while like symbols are used to designate the same parts in the different figures.

The present invention contemplates the provision of interchangeable disks each having a plurality of seed feed openings which may be selectively brought into registry with the seed delivery aperture in the bottom of the seed holding hopper of the drill and thus into feeding position, so that an opening of suitable size may be provided for the particular kind of seed which is to be sown. While the particular disposition of the different seed feed openings in each disk forms no part of the present invention and the openings may therefore be disposed in any desired manner suitable to permit them to be selectively brought into registry with the delivery aperture, I prefer to arrange the openings in symmetrical annularly spaced relation with their respective centers at different distances from the center of the disk in correspondence with the size of the different openings, so that the openings when brought to operative position will occupy different relations with respect to said aperture and to the agitator wheel of the drill in accordance with the invention of Charles J. Allen disclosed and claimed in an application for United States Letters Patent Serial No. 273,196 entitled Improvements in seed drills executed of even date herewith.

As shown, the drill comprises a pair of laterally spaced generally horizontally extending frame bars 1, 1 between the forward ends of which the drive wheel 2 is mounted for rotation, a follower wheel 3 being similarly mounted between the rear ends of the bars in the usual way. Drills of this character are ordinarily designed to be pushed over the ground by means of handle bars (not shown) suitably connected to the frame, while the seed disposed in a hopper, generally designated as 4 and hereinafter more particularly described, is fed to the furrow through a delivery spout 5 mounted between the frame members and serving as a support for the hopper. A furrow opening plow 6 desirably arranged for vertical adjustment so as to enable the depth of the furrow to be varied on the spout so as to project generally forwardly therefrom, while a pair of furrow closers 7 may be pivotally attached to the spout so as to extend rearwardly therefrom to close the furrow after the seed has been deposited therein. In one form or another the several parts to which reference has just been made are commonly found in seed drills of the general type to which my invention is more particularly applicable and thus require no further description.

In accordance with the present invention the hopper is so arranged as to be separable from the delivery spout on a plane which is inclined transversely of the machine as best shown in Fig. 2 and means hereinafter described are provided for locking the hopper in position on the spout yet in such manner as to enable its ready removal therefrom when desired. As is usual, the hopper comprises a lower portion 10 desirably formed as a single casting and an upper portion 10′ of sheet metal suitably united thereto while within the hopper is disposed an agitator wheel 11 arranged to rotate in a plane extending transversely of the machine; this wheel is mounted on a shaft 12 journaled in bosses 13 provided on opposite ends of the hopper and extends forward to a point adjacent the axle of the drive wheel where it is connected through suitable gearing (not shown) with the latter so as to rotate in correspondence therewith and thus in turn rotate the agitator wheel. As I prefer to dispose the hopper symmetrically with respect to the center line of the drill and as the shaft 12 must necessarily clear the rim of the drive wheel, the shaft is laterally offset from the said center line but extends parallel thereto so as to pass through the hopper somewhat on one side of the center thereof, and to assist in concentrating the seed in the bottom of the hopper and adjacent the agitator wheel and feed port hereinafter described, the walls of the lower part of the hopper are all inclined inwardly and downwardly in the general direction of the wheel which, when the drill is in operation, rotates as indicated by the arrow in Fig. 2. It is desirable, however, in order to prevent the seeds from being crushed between the periphery of the wheel and the wall of the hopper that the latter be arranged very closely adjacent that portion of the periphery of the wheel which lies substantially between its horizontal diameter and the front edge of the feed port in the bottom of the hopper as it is in this region there is the greatest likelihood of the seeds being drawn in and crushed between the wheel and the wall; thus that part of the wall designated as 15 and lying adjacent the wheel in the region referred to is curved on its inner face to correspond with the curvature of the rim of the wheel and arranged to lie very closely adjacent the latter.

The agitator wheel may be of any suitable form although I prefer to utilize an agitator wheel such as is shown in the drawings and which is bent in opposite directions from its central plane in alternate directions so that its periphery when viewed edgeways has somewhat the appearance of a sinuous line which crosses and re-crosses the said central plane, this form of wheel being very effective in stirring up and agitating the seed. In practice the hub and web portion of the wheel may conveniently be formed as a single casting and the periphery of the wheel ground or otherwise finished so it will run true with the axis of the shaft.

A feed port 17 is formed in the bottom of the hopper at a point somewhat behind the agitator wheel considered with respect to the direction of its rotation. This port may be of any suitable shape and is sufficiently large to readily permit the passage of the largest seeds which the drill is designed to sow, while the relation of the port to the wheel is desirably such that as the latter rotates its edge will more or less sweep across or above the port, first in one direction and then in the other, the wheel being thus effective both to agitate the seed in the hopper and to carry it across the port and thereby assist its passage through the latter and through the feed opening in the subjacent feed control disk now to be described.

As heretofore stated, the feed control disks D are interchangeable with each other and each disk is provided with a plurality of feed openings desirably of graduated sizes, that is, all of the feed openings in one disk may be of relatively large size as shown in Fig. 6 and all of the openings in another disk of relatively small size as shown in Fig. 7, and any desired number of disks may be provided, although three will ordinarily be found sufficient to give an adequate number of feed openings of graduated sizes. Under operative conditions one of these disks is disposed beneath the hopper 10 in such position that a portion of it is interposed between the under face of the hopper and the upper surface of the delivery spout 5, means being provided to form a pivotal center about which the disk can be rotated so as to bring any desired feed opening into alignment with the port 17, together with means adapted to permit the disks to be readily interchanged when the hopper is removed from the spout as well as to insure proper registration of the feed openings with the port. In accordance with my invention, the means which form the pivotal center for the disk are combined with the means by which the hopper is operatively locked on the spout in such manner that the actuation of said last mentioned means to permit the removal of the hopper from the spout or to lock it thereto do not in any way interfere with the adjusted position of the disk so that removal or replacement of the hopper can be effected as desired without changing or in any way disturbing the setting of the disk.

Each of the feed control disks comprises a circular plate 20 of sheet metal of such thickness as to prevent the disk from being readily bent out of shape and is provided with a central pivot hole 21, an annularly spaced series of locking holes 22 surrounding and radially spaced from the pivot hole, and an annularly spaced series of feed openings 23 adjacent the rim of the disk and hereinafter more particularly described.

To accommodate the disk when assembled on the hopper, the inclined under face of the latter is disposed in two parallel planes, the major portion 25 of said face which lies behind and adjacent the sides of the feed port 17 being upwardly offset from the portion 25' which lies in front of the port and generally beneath the agitator wheel, so that a shoulder 25'' is provided which coincides with and forms, in fact, the front edge of the port. The depth of the offset between the surfaces 25 and 25' is determined by the thickness of the feed disk, being preferably very slightly greater than the latter, so that when the disk is disposed against the surface 25 its under face will just clear the surface 25'.

The hopper is provided with an integral angularly extending lug 26 whose under face forms a continuation of the surface 25; this lug has a slot 27 in its outer free end and is bored at right angles to its under face to provide a pivot hole 28 for the reception of the pivot pin 30 which is mounted on the removable locking cam 31 hereinafter more fully described. The position of the hole 28 is so determined that when the pivot hole 21 in one of the disks as aligned therewith, the edge of the disk will just clear the shoulder 25'' which desirably conforms to the arc of a circle struck from a center coincident with that of hole 28. Any one of the feed control disks may therefore be operatively positioned on the hopper by aligning the pivot hole 21 in the disk with the pivot hole 28 in the hopper and passing the pivot pin 30 therethrough. This pin is long enough to project above the upper surface of lug 26 and is provided with an annular groove 30' so disposed that when the locking cam which carries the pin is seated against the under face of the disk the groove will just clear the upper surface of the lug, in which position it may be secured by means of the locking element 35. This element is formed from a strip of spring steel or the like and provided at one end with a slot 36 adapted to receive the pin where it is reduced in diameter by the groove 30' and is desirably curved over at its opposite end to afford a convenient hold for the thumb and finger of the operator. The locking element is also provided with a locking pin 37 of suitable diameter to snugly enter the locking holes 22 in the feed controlling disks and is desirably slightly bowed between the locking pin 37 and its slotted end as shown in Fig. 5. Thus, after the feed control disk has been placed on the bottom of the hopper and the pivot pin inserted through the pivot hole in the disk and corresponding hole in lug 26 so as to bring the groove 30' above the plane of the latter, the locking element 35 may be forced longitudinally forward so as to enter the thinner portion of the pin as defined by the groove 30' into the slot 36 in the end of the element until the locking pin 37 aligns with one of the holes 22 in the disk so it can be pushed downwardly into the same while extending through slot 27. The locking element is therefore prevented from rotation about the pivot stud 30 and the several parts thus locked and the disk held immovable until the locking element is lifted so as to clear the locking pin from the subjacent locking hole 22 in the disk and then longitudinally withdrawn so as to free the pivot pin and permit it in turn to be withdrawn so the disk can be removed. Owing to the curvature of the forward end of the locking element that portion thereof which carries the locking pin is continuously yieldingly urged against the face of lug 26 after the locking element has been placed in position and the locking pin thus continuously held in the subjacent hole in the disk until lifted therefrom as just described. However, if the locking element is merely lifted from locking position so as to clear the locking pin from the disk but without withdrawing the element longitudinally from the stud 30, the disk can be freely rotated about the stud so as to bring a different opening into alignment with the feed port 17, and as each of the feed openings is diametrically aligned with one of the locking holes 22, proper registration of any given feed opening with the feed port 17 is assured whenever the locking pin will enter the diametrically opposed locking hole. Consequently, when adjusting the machine for a particular kind of seed it is only necessary for the operator, after determining the particular disk which he desires to use to assemble the latter on the hopper by passing the pivot pin through the disk and pivot hole 28 and bringing the locking element to a position to lock the pin in place. Then by raising the outer end of the element so as to keep the locking pin out of engagement with the disk he can readily rotate the latter until the desired feed opening is brought into approximately correct registry with the feed port 17; if the end of the pin is now permitted to engage the disk it is very easy to see which way the latter should be shifted in order to align the locking hole with the pin so it can enter the hole and lock the disk against rotation. If it be desired to merely change from one feed opening to the other in the same disk, it is only necessary to raise the locking pin sufficiently to permit the disk to be rotated until the desired opening is brought beneath the feed port and to then engage the pin in the proper locking hole. This adjustment may be made as will hereafter more fully appear without removing the hopper from the delivery spout as there is sufficient clearance between the parts to allow rotational movement of the disk at all times.

Mention has been made of the locking cam 31 which, in conjunction with certain means now to be described is utilized to secure the hopper to the delivery spout. This cam comprises a disk-like center portion supporting the pivot pin 30 substantially surrounded by an upwardly and inwardly beveled face 31' of generally spiral form and is also provided with an operating handle 40, the beveled face of the cam being adapted, when the pivot pin 30 is positioned in the pivot holes 21 and 28 of the disk and hopper to cooperate with an undercut substantially V-shaped surface 41 formed on the upper adjacent end of the delivery spout 5, it being of course understood that the upper surface of the central portion of the cam is preferably flat so as to seat snugly against the under face of the feed control disk. The hopper is provided with a depending lug 42 substantially below the agitator wheel and having a flat face adapted to seat against a corresponding surface 43 on the side of the delivery spout, as well as with a stud 44 projecting inwardly from the lug and adapted to seat in a recess 45 formed in the surface 43.

Thus, after the feed control disk and the locking cam have been assembled on the hopper as above described, the hopper may be assembled on the delivery spout by first seating it thereon somewhat to one side of the position it is designed to ultimately occupy and then sliding it upwardly and to the right when viewed as in Fig. 5 until the stud 44 enters the recess 45, the locking cam, of course, being turned during this operation to a position which will permit it to clear the upper edge of the undercut surface 41. The cam may now be turned so as to progressively bring its camming surface 31' into engagement with the undercut surface 41 and thereby draw the lug 42 snugly against the surface 43 of the delivery spout, thus locking the parts in position. It should be noted that the locking pressure exerted by the cam is directed against the undercut surface 41 and not against the feed control disk; in consequence, the disk can be readily rotated to bring any desired feed opening to operative position while the parts are assembled by merely lifting the outer end of the resilient locking element 35 so as to clear the locking pin 37 from the disk without in any way disturbing the adjusted position of cam 31 or removing the hopper from the spout, but of course when it is desired to substitute a different disk, it is ordinarily more convenient to remove the hopper entirely from the delivery spout while the substitution is being made.

Suitable means are also provided for shutting off the flow of seed from the hopper to the delivery spout when desired, said means preferably comprising a flat cut-off lever 50 of substantially bell crank form pivoted on a bolt 51 carried by a lug 52 formed on the hopper. One arm of this cut-off lever extends through a slot 53 formed in the wall of the delivery spout and is of sufficient length to permit its end to be moved beneath the feed disk so as to block the feed opening therein which is aligned with the feed port to thereby cut off the flow of seed or to be swung out of alignment with said opening, as in Fig. 3, so the seed can flow therethrough. The cut-off lever may be actuated by any suitable mechanism as, for example, an operating lever 55 mounted on a stud 56 disposed on the hopper and having a dog 57 engaging in a hole 58 near the other end of the cut-off lever, the operating lever being connected with a rod 59 extending to the handle bars of the drill or other point where it may be conveniently operated. Thus, by pushing or pulling on the rod the operating lever may be swung in either direction about stud 56 so as to throw the cut-off lever to cutting off position or vice versa. Desirably the stud 56 is made sufficiently long to permit the interposition of a coil spring 60 between its head and the hub 55' of the operating lever so as to yieldingly press the latter against the boss on the hopper which serves to support the stud, while the face of this boss is provided with a pair of notches cooperative with a projection on the stud so disposed that it will seat in one notch when the cut-off lever is in cutting-off position and in the other notch when it is in non-cutting off position to thereby yieldingly hold the lever in one such position or the other. While the notches and projection are not shown in the drawings it is believed the construction will be readily understood.

While I have herein illustrated and described one form of my invention with considerable particularity, I do not thereby desire or intend to specifically limit myself thereto nor to restrict myself to any precise features of design, construction or arrangement of the various parts, as changes and modifications may be made therein and/or the invention may be embodied in other forms of seed drills and implements of generally like character, without departing from the spirit and scope of the invention as defined in the appended claims.

Having thus described my invention, I claim and desire to protect by Letters Patent of the United States:

1. A seed drill comprising a frame, a delivery spout supported on the frame and having an undercut surface on one side and a recess on its opposite side, a hopper adapted to rest on and be supported by the spout and provided with a depending lug having a stud adapted to engage in said recess, and a cam carried by but removable from the hopper and adapted to cooperate with said undercut surface for locking the hopper to the spout.

2. A seed drill comprising a frame, a delivery spout supported on the frame, a hopper adapted to rest on and be supported by the spout and having a feed port in its bottom in alignment therewith, a feed control disk having a series of graduated annularly spaced feed openings interposed between the hopper and the spout, and means for removably locking the hopper to the spout comprising an undercut surface on the spout and a cam having a beveled spiral face adapted to cooperate therewith, a pin carried by the cam and forming a pivot for the disk, and a removable locking element engageable with said pin to hold the cam on the hopper in rotatable relation therewith.

3. A seed drill comprising a frame, a delivery spout supported on the frame, a hopper adapted to rest on and be supported by the spout and provided with an apertured lug and a delivery port in its bottom adapted for alignment with said spout, a feed control disk having a series of annularly spaced openings interposed between the hopper and the spout, and means for removably locking the hopper to the spout comprising an undercut surface on the spout and a cam having a beveled spiral face adapted to cooperate therewith, a pivot pin carried by the cam adapted to extend through the aperture in the lug and form a pivot for the disk, and a removable locking element engageable with the groove in the pin to prevent withdrawal of the pin through the aperture and to hold the cam on the hopper in rotatable relation therewith.

4. A seed drill comprising a frame, a delivery spout supported on the frame and having a transversely inclined upper surface, a hopper having a correspondingly inclined under surface adapted to rest on the spout and having a feed port in its bottom in alignment with the spout, a feed control disk having a series of graduated annularly spaced feed openings interposed between the hopper and the spout, means for locking the hopper on the spout comprising an undercut surface on the spout and a rotatable cam cooperative therewith, and means for removably securing the cam to the hopper comprising a lug carried by the hopper and provided with a hole, a pivot pin carried by the cam adapted to extend through the disk and through the hole in the lug and provided with a groove, and a removable resilient locking element adapted to seat on the face of the lug and to be received in said groove to thereby prevent the withdrawal of the pin through the hole in the lug.

5. A seed drill comprising a frame, a delivery spout supported on the frame and having a transversely inclined upper surface, a hopper having a correspondingly inclined under surface adapted to rest on the spout and having a delivery port in its bottom in alignment with the spout, a seed control disk having a series of annularly spaced feed openings interposed between the hopper and the spout and another series of locking openings symmetrically arranged with respect to the first series, means for locking the hopper to the spout comprising an undercut surface on the spout and a rotatable cam cooperative therewith, and means for removably securing the cam to the hopper comprising a lug carried by the hopper and provided with a hole, a pivot pin carried by the cam adapted to extend through the disk and through the hole in the lug and provided with a groove, and a removable resilient locking element carrying a locking pin and adapted to seat on the face of the lug and to be received in said groove to thereby prevent withdrawal of the pivot pin through the lug, said locking pin being adapted to seat in any one of the locking holes in the disk when said locking element is in position to thereby hold the disk against rotation with one of said openings in the disk aligned with the delivery port in the hopper.

In witness whereof I have hereunto set my hand this 25th day of April, 1928.

GEORGE L. KIER.